(12) United States Patent
Kimura et al.

(10) Patent No.: US 6,415,247 B1
(45) Date of Patent: Jul. 2, 2002

(54) SYSTEM IDENTIFICATION METHOD AND ITS RECORDING DEVICE

(75) Inventors: Takashi Kimura; Hideaki Sasaki; Hiroshi Ochi, all of Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/390,840

(22) Filed: Sep. 7, 1999

(30) Foreign Application Priority Data

Sep. 7, 1998 (JP) .......................................... 10-252409
Apr. 9, 1999 (JP) .......................................... 11-102286

(51) Int. Cl.[7] ........................ G06F 15/00; G06F 17/10; H04B 3/20
(52) U.S. Cl. ...................... 702/196; 702/190; 702/197; 708/322; 379/406.08; 370/290
(58) Field of Search .............................. 702/69–70, 74, 702/82, 109–110, 125–126, 190–197; 370/290, 241, 286; 708/319, 322–323; 379/406.08, 410, 406.06

(56) References Cited

U.S. PATENT DOCUMENTS

| | | | |
|---|---|---|---|
| 4,811,261 A | * | 3/1989 | Kobayashi et al. ......... 702/109 |
| 4,970,638 A | * | 11/1990 | Yeh et al. .................... 702/110 |
| 5,245,561 A | * | 9/1993 | Sugiyama .................... 708/332 |
| 5,455,819 A | * | 10/1995 | Sugiyama .................... 370/290 |
| 5,517,435 A | * | 5/1996 | Sugiyama .................... 370/290 |
| 5,867,486 A | * | 2/1999 | Sugiyama ................. 379/406.08 |

OTHER PUBLICATIONS

"A Least–Squares Approach To Blind Channel Identification", pp. 2982–2993, vol. 43, No. 12, Dec., 1995, Guanghan Xu et al.
"Equalization Based on Blind System Identification Using Second Order Statistics" M. Oshiro et al., 1998. (Duplicated with SIDS Submitted on Dec. 6, 1999 without translation).
Article No. A–4–22, Moshiro et al., "Equalization Based on Blind System Identification Using Second Order Statistics", (with English Translation attached pp. 1–4), 1998.
IEEE Transactions on Information Theory, vol. 40, No. 2, Mar. 1994, "Blind Identification and Equalization Based on Second–Order Statistics: A Time Domain Approach", L. Tong et al.

* cited by examiner

*Primary Examiner*—Bryan Bui
(74) *Attorney, Agent, or Firm*—Ratner & Prestia (57) ABSTRACT

A system identification device is provided capable of performing a sequential updating process and preventing the quantity of operation from becoming too complex. The system identification device includes a first delay for delay of $y_2$ (n), a matrix generator, a plurality of matrix calculators, a second delay, a third delay and a matrix separator for identifying an unknown system.

8 Claims, 8 Drawing Sheets

PRIOR ART

SYSTEM IDENTIFICATION METHOD AND ITS RECORDING DEVICE

FIELD OF THE INVENTION

The present invention relates to an on-line system identification method used in adaptive echo canceller, adaptive noise canceller or the like, and more particularly to high speed processing and sequential updating processing of blind system.

BACKGROUND OF THE INVENTION

The meanings of symbols used in the invention are shown in Table 1.

TABLE 1

Symbols used in formulas are meant as follows.

| Symbol | Meaning |
|---|---|
| x(n) | Input signal at time n |
| $y_1(n)$ | Output from unknown system 1 at time n |
| $y_2(n)$ | Output from unknown system 2 at time n |
| $h_1$ | Impulse response matrix of unknown system 1 |
| $h_2$ | Impulse response matrix of unknown system 2 |
| $f_1$ | Impulse response matrix identifying unknown system 1 |
| $f_2$ | Impulse response matrix identifying unknown system 2 |
| ⊗ | Convolution |
| $L_1$ | Tap length of unknown system 1 |
| $L_2$ | Tap length of unknown system 2 |
| $r_{y_1y_2}(\tau)$ | Cross correlation function |
| $r_{y_1y_1}(\tau)$ | Auto correlation function |
| $e_1(n)$ | Error function 1 at time n |
| $e_2(n)$ | Error function 2 at time n |
| J | Evaluation function |
| Ĵ | Evaluation function defined newly by excluding expected value of evaluation function J |
| λ | Forgetfulness coefficient |
| μ | Step coefficient |
| I | Unit matrix |
| c | Arbitrary integer |
| t | Transposition |
| E[ ] | Operation of expected value |

Figure 8:
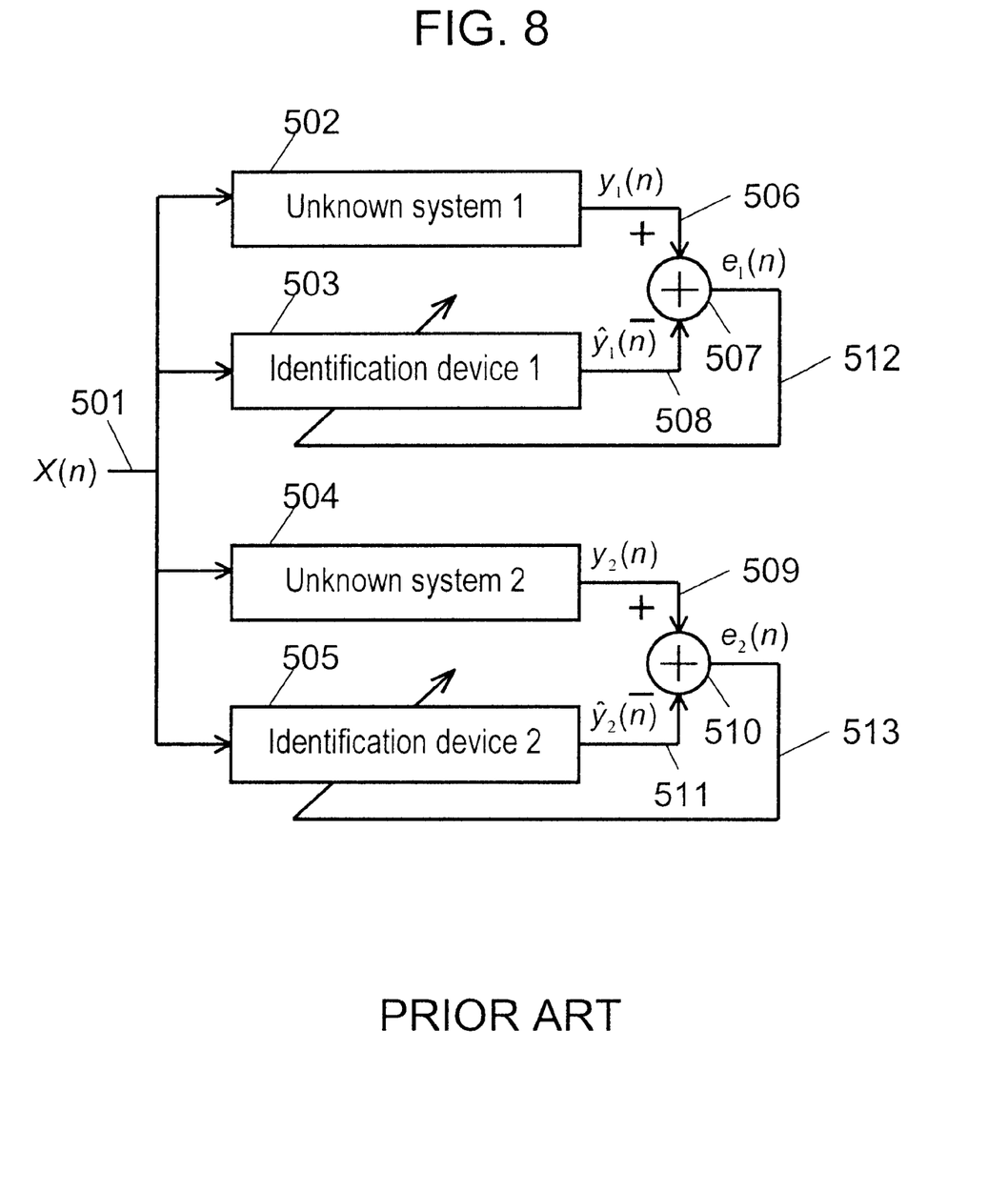
FIG. 8 is a block diagram showing a conventional system identification method.

A conventional system identification method is described while referring to FIG. 8. FIG. 8 is a block diagram showing a conventional system identification device. In FIG. 8, from one input line 501, a digital signal x (n) is transmitted through two unknown systems 502, 504, and digital signals $y_1$ (n) and $y_2$ (n) are output to output lines 506, 509. A first system identification device 503 is connected parallel to the first unknown system 502, and a second system identification device 505, to the second unknown system 504. To these system identification devices, a digital signal x (n) is entered same as in the unknown systems, and corresponding signals (formula 24) and (formula 25) are output to the output lines 508, 511.

$$\hat{y}_1(n) \qquad \text{[Formula 24]}$$

$$\hat{y}_2(n) \qquad \text{[Formula 25]}$$

The digital signal $y_1$(n) output from the first unknown system 502 and the digital signal (formula 24) output from the first identification device 503 are fed into an adder 507. The digital signal $y_2$ (n) output from the second unknown system 504 and the digital signal (formula 25) output from the second identification device 505 are fed into an adder 510. At this time, it is supposed that the system identification device 503 and system identification device 505 are identified by a representative adaptive algorithm, such as least mean square (LMS) or recursive least square (RLS). The system identification by adaptive algorithm is realized by following calculation. The adder 507 calculates error $e_1$ (n) between the output digital signal $y_1$ (n) of the first unknown system 502 and the output digital signal (formula 24) of the system identification device 503, feeding back the error, and changing the filter coefficient of the first system identification device 503 so that the error $e_1$ (n) may be closer to zero. This is the same in the second system identification device 505. Thus, in the prior art, when identifying the system, the system identification device required the same input digital signal as in the unknown system.

Figure 1:
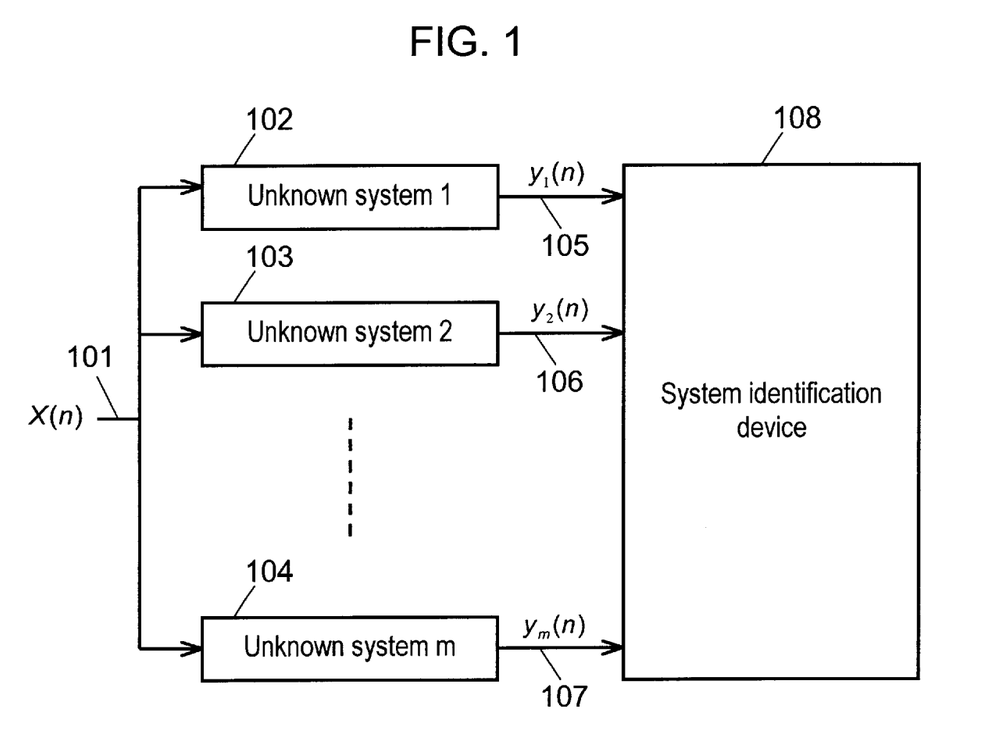
FIG. 1 is a block diagram showing a general system identification method.

Now suppose to identify an unknown system by employing a method proposed in a paper disclosed in "A Least-Squares Approach to Blind Channel Identification" (IEEE Transactions on Signal Processing Vol. 43, No. 12, 1995, pp. 2982–2993) (hereinafter called reference 1). This is explained by reference to FIG. 1. FIG. 1 is a block diagram showing a general system identification method shown in reference 1. In FIG. 1, first unknown systems 102~m-th unknown systems 104 show m different unknown systems, or m different unknown systems spuriously decomposing one unknown system. In FIG. 1, m unknown systems are shown, but the generality is not lost if the number of unknown systems is limited to two, and therefore, in the following explanation, the number of unknown systems is limited to two for the sake of simplicity.

In FIG. 1, from one input line 101, a digital signal x (n) is transmitted through two unknown systems 102 and 103, and they output digital signals $y_1$ (n) and $y_2$ (n) to output lines 105 and 106. According to reference 1, in a system identification device 108, using only these two input digital signals $y_1$ (n), $y_2$ (n), it is possible to identify the first unknown system 102 and second unknown system 103. It means that only the outputs of the unknown systems are used as the input to the system identification device 108 to be identified, and the input digital signal x (n) to the unknown systems is not necessary. Besides, "Equalization Based on Blind System Identification Using Second Order Statistics (a paper included in pre-print A-4-22 of General Assembly of Japan Society of Electronic Information and Communication; hereinafter called reference 2) can be also used for building up a system identification device same as reference 1. The both are known as the blind system.

In reference 1 and reference 2, however, the method of identifying the unknown system by the digital signal output from the unknown system, that is, only the off-line processing is mentioned, and the system identification method in reference 1 or reference 2 cannot be used in on-line processing for updating sequentially while operating the object unknown system, and hence it cannot be used in the adaptive echo canceller requiring real-time processing. Another problem is that the formula development mentioned in reference 1 or reference 2 is not a formula development in which sequential updating process can be introduced.

In the case of an off-line processing, if the characteristic of the unknown system is changed due to some reason (for example, a change in time), a different value from the intended unknown system is identified. To identify according to the method of reference 1 or reference 2, it is necessary to calculate the inverse matrix or eigenvalue, and the quantity of calculation becomes tremendous. In the system identification device and system identification method for use in adaptive echo canceller or the like, and in the recording medium in which the execution program of identification method is recorded, by formula development different from reference 1 or reference 2, that is, by formula development for updating sequentially and not performing operation of inverse matrix, it is required to perform sequential updating process and prevent increase to tremendous quantity of calculation.

SUMMARY OF THE INVENTION

It is hence an object of the invention to present a system identification method capable of performing sequential updating process and preventing increase to tremendous quantity of calculation.

To achieve the object, the system identification method of the invention is a system identification method for identifying an unknown system by feeding output digital signal $y_1$ (n) and output digital signal $y_2$ (n) of the unknown system, comprising a first delay step for delaying the input digital signal $y_2$ (n) by one unit time, a formula 2 matrix generating step for generating an input matrix (formula 2) shown in formula 1 from the input digital signal $y_1$ (n) and the digital signal $y_2$ (n−1) output at the first delay step, a formula 13 matrix calculating step for calculating the state matrix (formula 13) at the present time shown in formula 12 from the matrix output at the formula 2 matrix generating step and the state matrix (formula 11) calculated one unit time before, a formula 15 matrix calculating step for calculating the state matrix (formula 15) at the present time shown in formula 14 from the matrix output at the formula 2 matrix generating step, the matrix output at the formula 13 matrix calculating step, and the state matrix (formula 11) calculated one unit time before, a second delay step for storing the matrix output at the formula 15 matrix calculating step, a formula 18 matrix calculating step for calculating the state matrix (formula 18) at the present time shown in formula 17 from the matrix output at the formula 2 matrix generating step, input digital signal $y_2$ (n), input digital signal $y_1$ (n), the matrix output at the formula 13 matrix calculating step, and the state matrix (formula 16) calculated one unit time before, a third delay step for storing the matrix output at the formula 18 matrix calculating step, and a formula 19 and formula 20 matrix separating step for separating formula 19 and formula 20 identified at the formula 18 matrix calculating step into a necessary format individually.

As a result, a system identification method capable of performing sequential updating process and preventing increase to tremendous quantity of calculation is obtained.

DETAILED DESCRIPTION OF THE PREFERRED EMBODIMENTS

Referring to FIG. 1 through FIG. 7 and the following Formulas 1–23, preferred embodiments of the invention are described below.

$$Y(n) = yI(n) \begin{pmatrix} -y_2(n-1) \\ -y_2(n-2) \\ \vdots \\ -y_2(n-L_1+2) \\ -y_2(n-L_1+1) \\ y_1(n) \\ y(n-1) \\ \vdots \\ y_1(n-L_2+2) \\ y_1(n-L_2+1) \end{pmatrix} \quad \text{[formula 1]}$$

$Y(n)$ [Formula 2]

$E[Y(n)Y^t(n)]=R$ [Formula 3]

$R$ [Formula 4]

$E[y_1(n)y_2(n)Y(n)]=P$ [Formula 5]

$P$ [Formula 6]

$F=R^{-1}P$ [Formula 7]

$F$ [Formula 8]

$f_1$ [Formula 9]

$f_2$ [Formula 10]

$Q(n-1)$ [Formula 11]

$$K(n) = \frac{Q(n-1)Y(n)}{\{1+Y^t(n)Q(n-1)Y(n)\}} \quad \text{[Formula 12]}$$

$K(n)$ [Formula 13]

$Q(n)=Q(n-1)-K(n)Y^t(n)Q(n-1)$ [Formula 14]

$Q(n)$ [Formula 15]

$F(n-1)$ [Formula 16]

$F(n)=F(n-1)+K(n)\{y_1(n)y_2(n)-Y^t(n)F(n-1)\}$ [Formula 17]

$F(n)$ [Formula 18]

$f_1(n)$ [Formula 19]

$f_2(n)$ [Formula 20]

$$K(n) = \frac{\hat{a}^{-1}Q(n-1)Y(n)}{\{1+\hat{a}^{-1}Y^t(n)Q(n-1)Y(n)\}} \quad \text{[Formula 21]}$$

$$K(n) = \frac{\lambda^{-1}Q(n-1)Y(n)}{\{1+\lambda^{-1}Y^t(n)Q(n-1)Y(n)\}}$$

$Q(n)=\lambda^{-1}Q(n-1)-\lambda^{-1}K(n)Y^t(n)Q(n-1)$. [Formula 22]

$F(n)=F(n-1)-\mu(y_1(n)y_2(n)-F^t(n-1)Y(n))Y(n)$. [Formula 23]

(Embodiment 1)

First, in FIG. 1, when two arbitrary transmission lines are selected, that is, in the case of a single-input double-output (SIDO) model, the following relation is established at the output side according to reference 2.

To introduce the sequential updating process, the formula is developed as follows.

$$h_1(\tau) \otimes r_{y_1y_2}(\tau) = h_2(\tau) \otimes r_{y_1y_1}(\tau) \quad \text{[Formula 26]}$$

The identification impulse response of the unknown system is formula 27 and formula 28, and formula 26 is expressed by momentary values, and when the difference of the left side and right side of formula 26 becomes the minimum, the impulse matrix formula 46 and formula 47 of the unknown system are identified. Supposing the difference of the left side and right side to be error $e_1(n)$, the following expressions are obtained.

$$f_1(\tau) \quad \text{[Formula 27]}$$

$$f_2(\tau) \quad \text{[Formula 28]}$$

$$e_1(n) = f_1(\tau) \otimes (y_1(n)y_2(n-\tau)) - f_2(\tau) \otimes (y_1(n)y_1(n-\tau)) \quad \text{[Formula 29]}$$

Herein, in formula 29, assuming $f_1(0)=1$ (any one of components of formula 27 and formula 28 may be set to 1), and replacing error $e_1(n)$ by $e_2(n)$, the following formula is obtained.

$$e_2(n) = y_1(n)y_{20}(n) - F^t Y(n) \quad \text{[Formula 30]}$$

At this time, each vector is as shown in formula 31 and formula 1.

$$F = [f_1^{\ 1} \cdots f_1^{\ L1-2} f_1^{\ L1-1} f_2^{\ 0} f_2^{\ 1} \cdots f_2^{\ L2-2} f_2^{\ L2-1}] \quad \text{[Formula 31]}$$

As the evaluation reference for determining the vector F, the mean square error of formula 30 is obtained. It is defined as the evaluation function, and shown below.

$$J = E[y_1(n)y_2(n) - FY(n))^2] \quad \text{[Formula 32]}$$

Then formula 32 is developed.

$$\begin{aligned} J &= E[(y_1(n)y_2(n) - F^t Y(n))^2] \quad \text{[Formula 33]} \\ &= E[(y_1(n)y_2(n))^2] - 2F^t E[y_1(n)y_2(n)Y(n)] + \\ &\quad F^t E[Y(n)Y^t(n)]F \\ &= r - 2F^t P + F^t R F \end{aligned}$$

At this time, formula 3, formula 5, and formula 34 are individually obtained.

$$E[(y_1(n)y_2(n))^2] = r \quad \text{[Formula 34]}$$

Here, formula 33 is a quadratic function about vector F, and the solution of vector F is automatically determined, and the sequential updating process can be introduced. The solution of vector F is obtained by determining the minimum value (optimum solution) of evaluation function J.

To determine the optimum solution, when partially differentiated by vector F, the following is obtained.

$$\frac{\partial J}{\partial F} = -2RF + 2P \quad \text{[Formula 35]}$$

The optimum solution is obtained when formula 35=0, and hence the equation of formula 7 is deduced.

By using formula 7, an off-line blind system identification method is obtained. The means of calculating each matrix is explained below.

Figure 2:
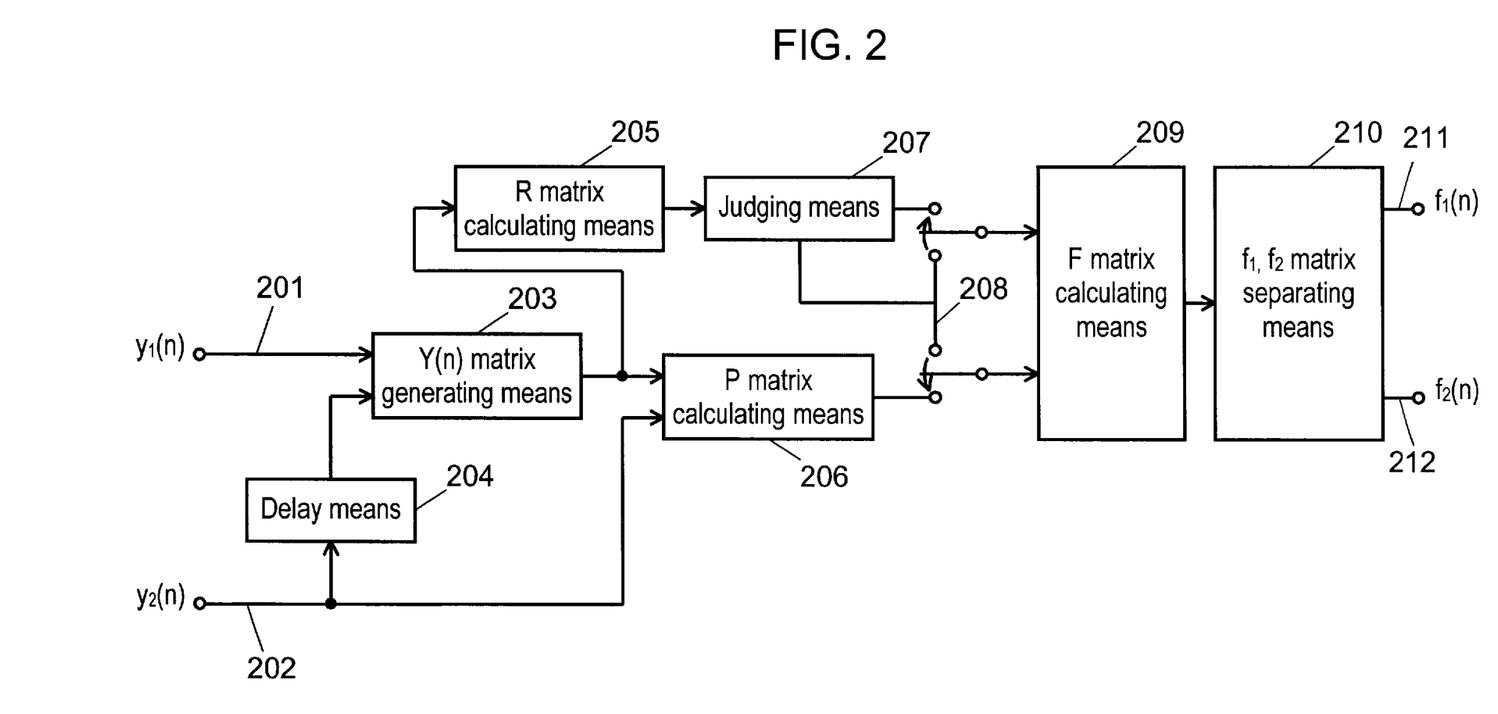
FIG. 2 is a block diagram showing a system identification device according to a system identification method in embodiment 1 of the invention.

FIG. 2 is a block diagram showing a system identification device using the system identification method of embodiment 1 of the invention, corresponding to the system identification device 108 in FIG. 1. In this specification, the term "means" is used to refer to both hardware and software.

In FIG. 2, a digital signal $y_1(n)$ is entered in an input line 201, and a digital signal $Y_2(n)$, into an input line 202. Formula 2 matrix generating means 203 generates an input matrix (formula 2) shown in formula 1 from the input digital signal $y_1(n)$ and output digital signal $y_2(n-1)$ of delay means 204 mentioned below. The delay means 204 is a unit delay circuit for delaying the digital signal $y_2(n)$ by one unit time, and outputs $y_2(n-1)$. Formula 4 matrix calculating means 205 calculates a state matrix (formula 4) shown in formula 2 from the input matrix (formula 2) generated in the formula 2 matrix generating means 203. Formula 6 matrix calculating means 206 calculates a state matrix (formula 6) shown in formula 5 from the input matrix (formula 2) generated in the formula 2 matrix generating means 203 and input digital signal $y_2(n)$. Judging means 207 judges the degree of convergence of components of state matrix (formula 4) and state matrix (formula 6). Switching means 208 is controlled by the result of judgement by the judging means 207. Formula 8 matrix calculating means 209 calculates a state matrix (formula 8) shown in formula 7 from the sate matrix (formula 4) calculated in the formula 4 matrix calculating means 205, and the state matrix (formula 6) calculated in the formula 6 matrix calculating means 206. Formula 9 and formula 10 matrix separating means 210 separates into an impulse response matrix (formula 9) of the first unknown system 102 (see FIG. 1) and an impulse response matrix (formula 10) of the second unknown system 103 identified from the state matrix (formula 8) calculated in the formula 8 matrix calculating means 209. The impulse response matrix (formula 9) is output to an output line 211, and the impulse response matrix (formula 10), to an output line 212.

The state matrix (formula 8) is determined as shown in formula 31.

At this time, since the impulse response matrix (formula 9) of the identified first unknown system 102 and the impulse response matrix (formula 10) of the second unknown system 103 are values calculated by assuming $f_1^{\ 0}=1$, the filter coefficient is obtained as being normalized at $f_1^{\ 0}=1$. In a practical system, it is needed to adjust the gain by AGC or the like in a later stage of this system identification device.

In thus constituted system identification device, its function is explained below.

The input digital signals $y_1(n)$ and $y_2(n)$ into this system are digital signals sampled in a period of T seconds and having a certain value in every period T. These digital signals $y_1(n)$ and $y_2(n)$ are entered into the formula 2 matrix generating means 203 and delay means 204 as data strings free from delay. At the same timing, the formula 4 matrix calculating means 205 and formula 6 matrix calculating means 206 are put into operation. These means 203, 204, 205, 206 operate for a specific time, and when the judging means 207 judges that the degree of convergence of the components of the state matrix (formula 4) and state matrix (formula 6) has reached a desired value, the switching means 208 is connected to the formula 8 matrix calculating means 209. The formula 8 matrix calculating means 209 operates according to the desired value. This is an off-line processing of identification of the unknown system.

Figure 3:
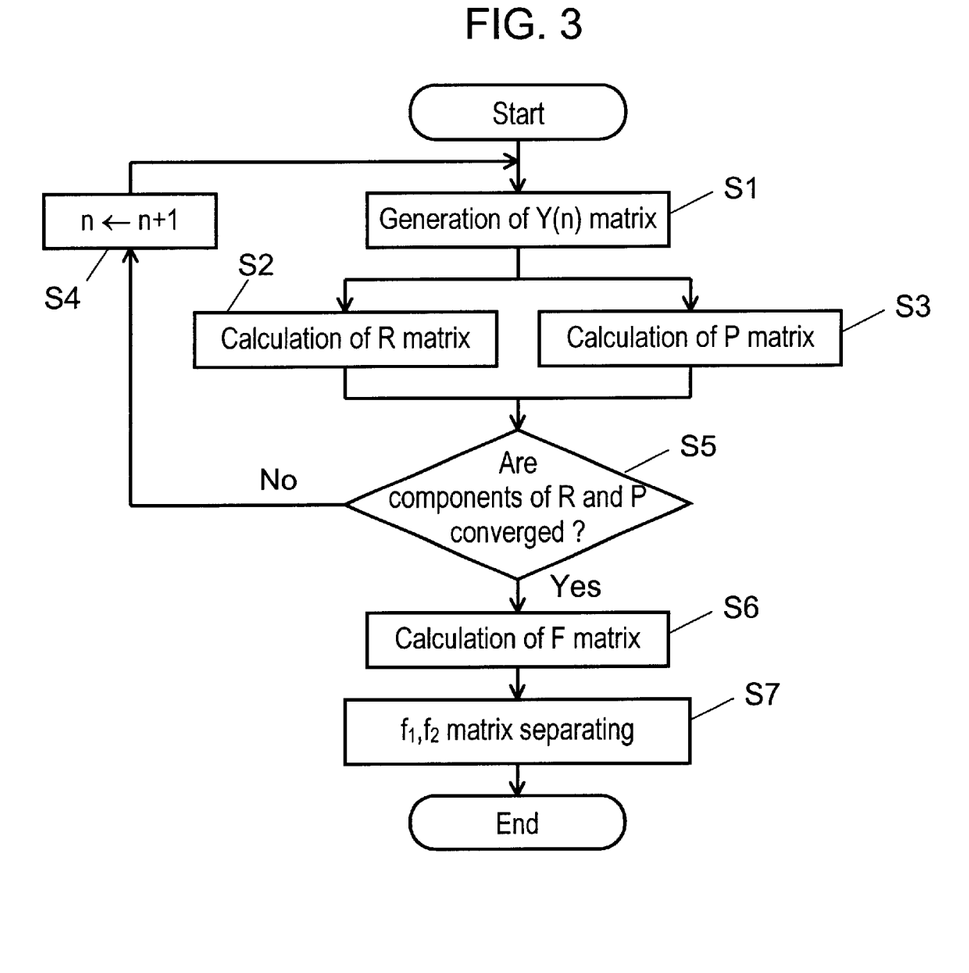
FIG. 3 is a flowchart showing the operation of the system identification device in FIG. 2.

The operation of the system identification device in FIG. 2 is described while referring to FIG. 3. FIG. 3 is a flowchart showing the operation of the system identification device in FIG. 2. This operation is explained as being started from time n.

First, the formula 2 matrix generating means 203 generates an input matrix (formula 2) shown in formula 1 from the one time unit delay (delay step) of the input digital signal $y_2$ (n) by the delay means 204 and input digital signal $y_1$ (n) (S1, formula 2 matrix generating step). The formula 4 matrix calculating means 205 calculates the state matrix (formula 4) shown in formula 3 (S2, formula 4 matrix calculating step). Parallel to this operation, the formula 6 matrix calculating means 206 calculates the state matrix (formula 6) shown in formula 5 (S3, formula 6 matrix calculating step). Consequently, the judging means 207 judges if the state matrix (formula 4) or state matrix (formula 6) generated at step 2 or 3 has converged or not (S5, judging step), and if not converged, the process goes to step 4 to start again from the process of step 1. When converged, advancing to step 6, the formula 8 matrix calculating means 209 calculates the state matrix (formula 8) shown in formula 7 (formula 8 matrix calculating step). The impulse response (formula 9) identifying the first unknown system 102 and the impulse response (formula 10) identifying the second unknown system 103 are separated from each other (formula 9 and formula 10 matrix separating step).

By recording the program for executing the system identification method of the embodiment shown in FIG. 3 in a recording medium, this operation can be easily executed by a computer system, and since it is easy to move the recording medium, each step can be executed anywhere. The recording medium is, for example, an optical disk, but not limited to this, similar effects are obtained in IC card, ROM cassette and others capable of recording the program.

Thus, according to the embodiment, when identifying the system, the digital signals x (n) required in the unknown systems 102 and 103 in the conventional identification method are not necessary in the system identification device 108. This embodiment 1 can deduce a formula development easy in sequential updating process.

(Embodiment 2)

In embodiment 2, what differs from embodiment 1 is that the sequential updating blind system identification method is applied in the state matrix (formula 4) and state matrix (formula 6) calculated above. First, each matrix in formula 7 may be expressed as follows, supposing to be determined each at time n.

$$F(n) = R^{-1}(n)P(n) \quad \text{[Formula 36]}$$
$$= \{R(n-1) + Y(n)Y^t(n)\}^{-1}\{P(n-1) + y_1(n)y_2(n)Y(n)\}$$

The formula of inverse matrix is as follows.

$$(A+BC)^{-1} = A^{-1} - A^{-1}B(I+CA^{-1}B)^{-1}CA^{-1} \quad \text{[Formula 37]}$$

Suppose to develop the first term of the right side of formula 36 by applying formula 37.

$$\{R(n-1)+Y(n)Y^t(n)\}^{-1} = R^{-1}(n-1) - R^{-1}(n-1)Y(n)\{I+Y^t(n)R^{-1}(n-1)Y(n)\}^{-1}Y^t(n)R^{-1}(n-1) \quad \text{[Formula 38]}$$

At this time, it is defined as follows.

$$R^{-1}(n-1) = Q(n-1) \quad \text{[Formula 39]}$$

$$K(n) = Q(n-1)Y(n)\{I+Y^t(n)Q(n-1)Y(n)\}^{-1} \quad \text{[Formula 40]}$$

From these expressions, formula 36 can be developed as follows.

$$\{R(n-1)+Y(n)Y^t(n)\}^{-1}\{P(n-1)+y_1(n)y_2(n)Y(n)\}$$
$$=Q(n-1)P(n-1)-K(n)Y^t(n)Q(n-1)P(n-1)+y_1(n)y_2(n)\{I-K(n)Y^t(n)\}Q(n-1)Y(n)$$

$$=F(n-1)+K(n)\{y_1(n)y_2(n)-Y^t(n)F(n-1)\} \quad \text{[Formula 41]}$$

Summing them up, the sequential updating blind system identification method is as expressed in formula 12, formula 17, formula 14, formula 42, and formula 43. At this time, actually, the operation is executed in the sequence of formula 12, formula 17, and formula 14. At this time, the initial values are as shown in formula 42 and formula 43.

$$F(0)=0 \quad \text{[Formula 42]}$$

$$Q(0)=cI \quad \text{[Formula 43]}$$

The means for calculating each matrix is explained below.

Figure 4:
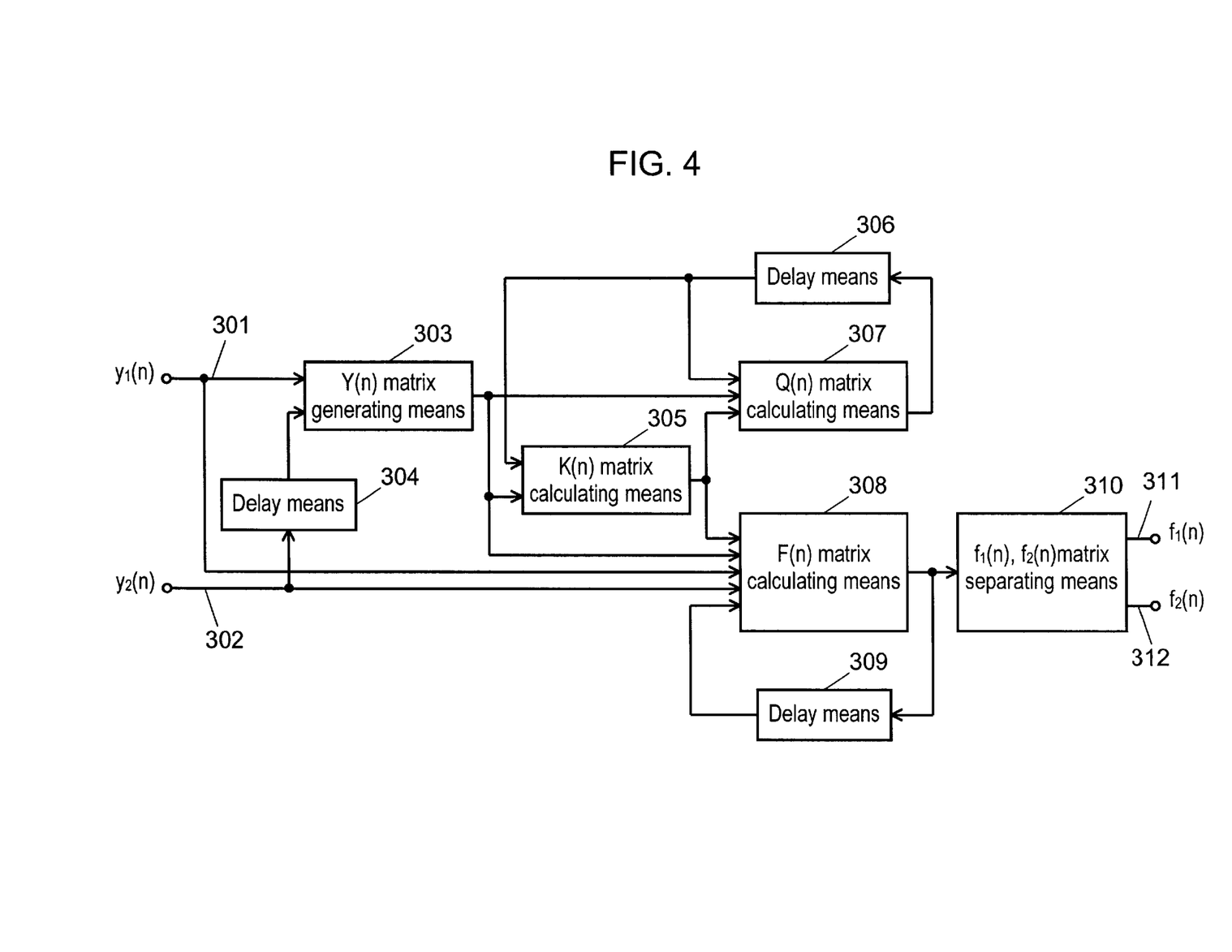
FIG. 4 is a block diagram showing a system identification device according to a system identification method in embodiment 2 of the invention.

FIG. 4 is a block diagram showing a system identification device using the system identification method of embodiment 2 of the invention, corresponding to the system identification device 108 in FIG. 1.

In FIG. 4, a digital signal $y_1$ (n) is entered in an input line 301, and a digital signal $Y_2$ (n), into an input line 302. Formula 2 matrix generating means 303 generates an input matrix (formula 2) shown in formula 1 from the input digital signal $y_1$ (n) and output digital signal $y_2$ (n−1) of first delay means 304 mentioned below. The first delay means 304 is a unit delay circuit for delaying the digital signal $y_2$ (n) by one unit time, and outputs digital signal $y_2$ (n−1). Formula 13 matrix calculating means 305 calculates a state matrix (formula 13) at the present time shown in formula 12 from the input matrix (formula 2) generated in the formula 2 matrix generating means 303 and the state matrix (formula 11) calculated one unit time before output from second delay means 306 mentioned below. The second delay means 306 is a unit delay circuit for delaying the state matrix (formula 15) calculated in formula 15 matrix calculating means 307 mentioned below by one unit time, and outputs formula 11. The formula 15 matrix calculating means 307 calculates a state matrix (formula 15) at the present time shown in formula 14 from the input matrix (formula 2) generated in the formula 2 matrix generating means 303, the state matrix (formula 11) one unit time before output from second delay means 306 and the state matrix (formula 13) calculated in formula 13 matrix calculating means 305. Formula 18 matrix calculating means 308 calculates a state matrix (formula 18) shown in formula 17 from the input digital signal $y_1$ (n), input digital signal $Y_2$ (n), the input matrix (formula 2) generated in the formula 2 matrix generating means 303 and the state matrix (formula 16) one unit time before output from third delay means 309 mentioned below. The third delay means 309 is a unit delay circuit for delaying the state matrix (formula 18) calculated in formula 18 matrix calculating means 308 by one unit time, and outputs formula 16. Formula 9 and formula 10 matrix separating means 310 separates into an impulse response matrix (formula 9) of the first unknown system 102 and an impulse response matrix (formula 10) of the second unknown system 103 identified from the state matrix (formula 18) calculated in the formula 18 matrix calculating means 308. The impulse response matrix (formula 9) is output to an output line 311, and the impulse response matrix (formula 10), to an output line 312.

At this time, since the impulse response matrix (formula 9) of the identified first unknown system 102 and the impulse response matrix (formula 10) of the second unknown system 103 are values calculated by assuming $f_1^0=1$, the filter coefficient is obtained as being normalized at $f_1^0=1$. In a practical system, it is needed to adjust the gain by AGC or the like in a later stage of this system identification device.

In thus constituted system identification device, its function is explained below.

The input digital signals $y_1(n)$ and $y_2(n)$ into this system are digital signals sampled in a period of T seconds and having a certain value in every period T. These digital signals $y_1(n)$ and $y_2(n)$ are entered into the formula 2 matrix generating means 303 and first delay means 304 as data strings free from delay. At the same timing, the formula 13 matrix calculating means 305, second delay means 306, formula 15 matrix calculating means 307, formula 18 matrix calculating means 308, third delay means 309, and formula 9 and formula 10 separating means 310 are put into operation. The outputs (formula 9) and (formula 10) are also delivered as data free from delay.

Figure 5:
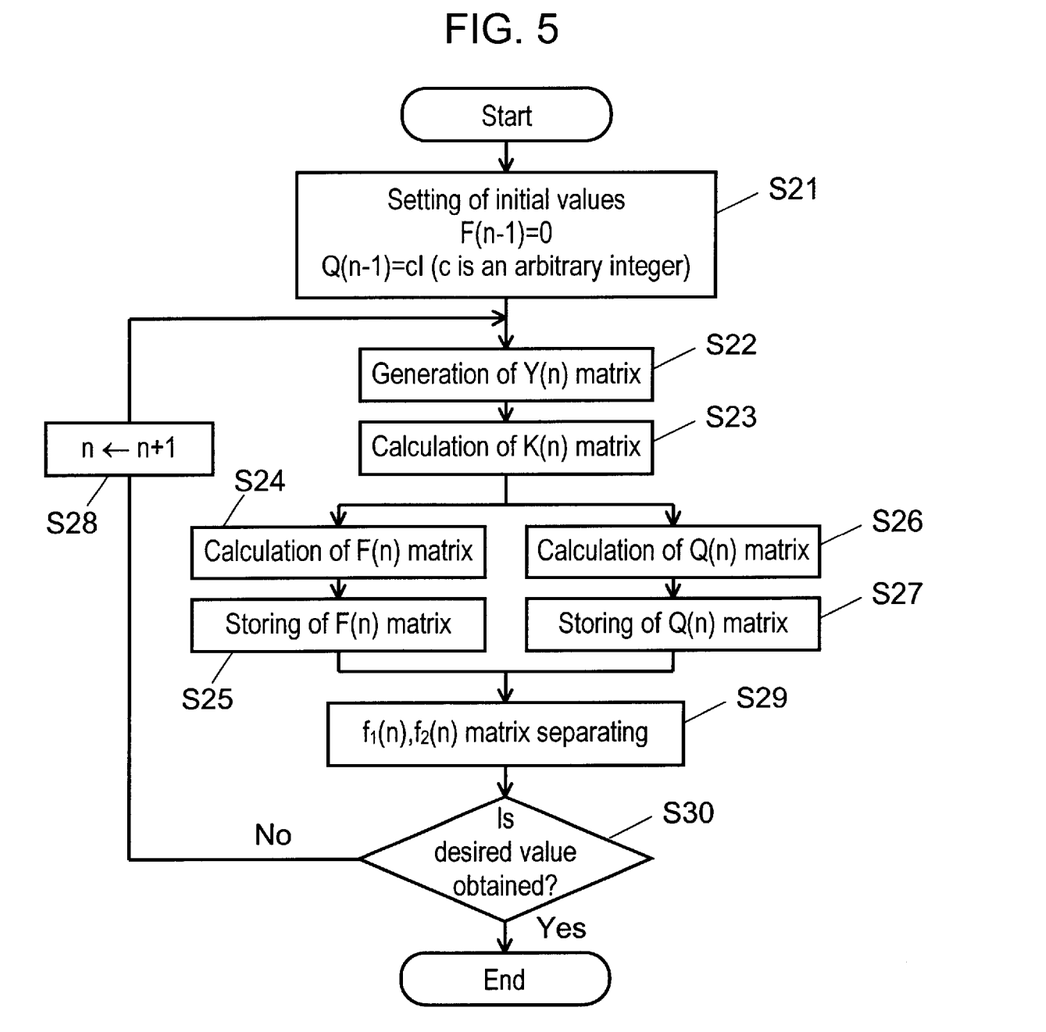
FIG. 5 is a flowchart showing the operation of the system identification device in FIG. 4.

The operation of the system identification device in FIG. 4 is described while referring to FIG. 5. FIG. 5 is a flowchart showing the operation of the system identification device in FIG. 4. This operation is explained as being started from time n.

First, initial values are set as shown in formula 44 and formula 45 (c is an arbitrary integer) (S21).

$$F(n-1)=0 \quad \text{[Formula 44]}$$

$$Q(n-1)=cI \quad \text{[Formula 45]}$$

Then, the formula 2 matrix generating means 303 generates an input matrix (formula 2) shown in formula 1 from the one time unit delay (first delay step) of the input digital signal $y_2(n)$ by the first delay means 304 and input digital signal $y_1(n)$ (S22, formula 2 matrix generating step). The formula 13 matrix calculating means 305 calculates the state matrix (formula 13) shown in formula 12 (S23, formula 13 matrix calculating step). Then, the formula 18 matrix calculating means 308 calculates the state matrix (formula 18) shown in formula 17 (S24, formula 18 matrix calculating step), and parallel to this operation, the formula 15 matrix calculating means 307 calculates the state matrix (formula 15) shown in formula 14 (S26, formula 15 matrix calculating step). The third delay means 309 stores the state matrix (formula 18) calculated at step 24 (S25, third delay step), and the second delay means 306 stores the sate matrix (formula 15) calculated at step 26 (S27, second delay step). The formula 9 and formula 10 matrix separating means 310 separates into the impulse response (formula 9) identifying the first unknown system 102 and the impulse response (formula 10) identifying the second unknown system 103 (S29, formula 9 and formula 10 matrix separating step). An evaluation step (not shown in FIG. 4) for arbitrarily processing the impulse responses (formula 9), (formula 10) of the unknown systems separated at step 29 is provided at the later stage of each output line, and the evaluation amount is specified. (For example, in echo canceling step, the echo erasing amount or the like is calculated.) It is then judged whether the desired value is obtained or not (S30). Unless reaching the desired value, moving to step S28, at next time value, the process jumps to step S22 in order to process similarly. Thereafter, steps 22 to 30 are repeated until the desired value is obtained. When the desired value is obtained, the process is terminated.

The above operation of the system identification device is performed during time T from input of a certain digital signal till input of a next digital signal. This is one cycle of the system identification device, and the system is identified by repeating the same operation on the digital signals entered successively. Incidentally, formula 8 is the identified values of formula 46 and formula 47, and hence the values do not change, usually, with the passing of the time.

$$h_1(n) \quad \text{[Formula 46]}$$

$$h_2(n) \quad \text{[Formula 47]}$$

In the case of sequential updating process, however, since formula 8 is gradually set closer to formula 46 and formula 47, it becomes formula 18 like formula 17.

By recording the program for executing the system identification method of the embodiment shown in FIG. 5 in a recording medium, this operation can be easily executed by a computer system, and since it is easy to move the recording medium, each step can be executed anywhere. The recording medium is, for example, an optical disk, but not limited to this, similar effects are obtained in IC card, ROM cassette and others capable of recording the program.

Thus, according to the embodiment, when identifying the system, the digital signals x (n) required in the unknown systems 102 and 103 are not necessary in the system identification device. Or, when the system identification device is composed as in reference 1 or reference 2, only off-line system identification was possible, but in the method of this embodiment, sequential system identification is possible, and if the characteristic of the unknown system is changed due to some reason, possibility of different identification is eliminated, and it does not require calculation of inverse matrix that takes an enormous amount operation.

(Embodiment 3)

In embodiment 3, what differs from embodiment 2 is that formula 12 is replaced by formula 21, and that formula 14 is replaced by formula 22. By using formula 21 and formula 22, the past data attenuates exponentially. Therefore, in updating calculation, the present data has a greater effect than the past data, and therefore, in addition to the effects of embodiment 2, sequential updating identification of unknown system is realized while following up fluctuations of the transmission line.

(Embodiment 4)

In embodiment 4, what differs from embodiment 2 or embodiment 3 is that it is applied to the sequential updating blind system identification method introducing the evaluation function excluding the expected value. The method of this embodiment can deduce a formula development smaller in the quantity of calculation than the method of embodiment 2 and 3.

In formula 32, the evaluation function excluding the expected value becomes as follows.

$$\hat{J}=(y_1(n)y_2(n)-F^tY(n))^2 \quad \text{[Formula 48]}$$

Developing formula 48, by differentiating partially by vector F, it follows as follows.

$$\frac{\partial \hat{J}}{\partial F} = -2(y_1(n)y_2(n) - F^t Y(n))Y(n) \quad \text{[Formula 49]}$$

By using the steepest descent method, when deformed into a sequential updating formula, formula 23 is obtained.

The means for calculating each matrix is explained below.

Figure 6:
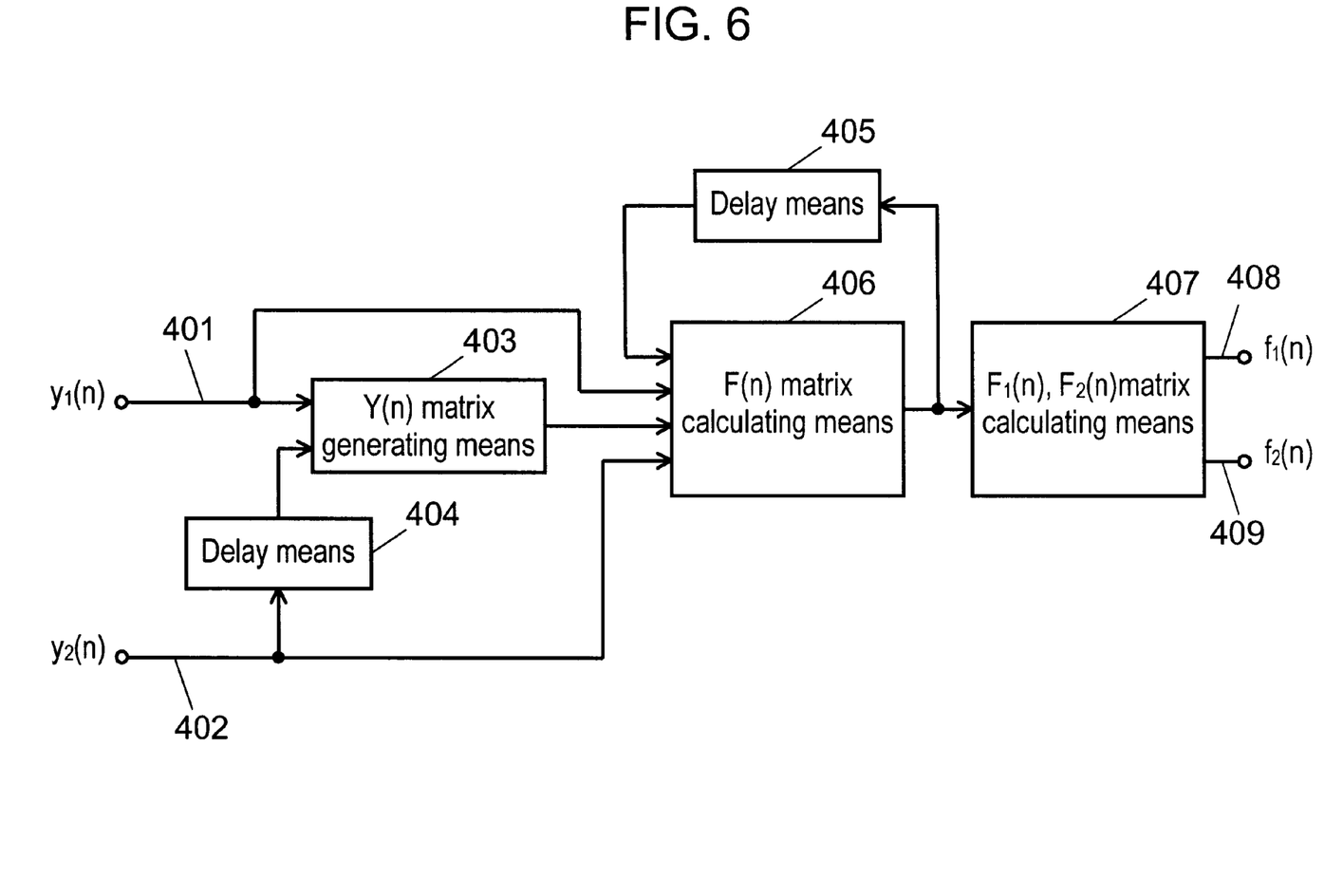
FIG. 6 is a block diagram showing a system identification device according to a system identification method in embodiment 4 of the invention.

FIG. 6 is a block diagram showing a system identification device using the system identification method of embodiment 4 of the invention, corresponding to the system identification device 108 in FIG. 1.

In FIG. 6, a digital signal $y_1(n)$ is entered in an input line 401, and a digital signal $Y_2(n)$, into an input line 402. Formula 2 matrix generating means 403 generates an input matrix (formula 2) shown in formula 1 from the input digital signal $y_1(n)$ and output digital signal $y_2(n-1)$ of first delay means 404 mentioned below. The first delay means 404 is a unit delay circuit for delaying the digital signal $y_2$ (n) by one unit time, and outputs $y_2$ (n−1). Formula 18 matrix calculating means 406 calculates a state matrix (formula 18) at the present time shown in formula 23 from the input matrix (formula 2) generated in the formula 2 matrix generating means 403, the state matrix (formula 16) calculated one unit time before output from second delay means 405 mentioned below, and digital signal $y_2$ (n) and digital signal $y_1$ (n). The second delay means 405 is a unit delay circuit for delaying the state matrix (formula 18) calculated in formula 18 matrix calculating means 406 by one unit time, and outputs formula 16. Formula 9 and formula 10 matrix separating means 407 separates into an impulse response matrix (formula 9) of the first unknown system 102 and an impulse response matrix (formula 10) of the second unknown system 103 identified from the state matrix (formula 18) calculated in the formula 18 matrix calculating means 406. At this time, since the impulse response matrix (formula 9) of the identified first unknown system 102 and the impulse response matrix (formula 10) of the second unknown system 103 are values calculated by assuming $f_1^0=1$, same as mentioned above, it is needed to adjust the gain by AGC or the like in a later stage of this system identification device.

In thus constituted system identification device, its function is explained below.

The input digital signals $y_1$ (n) and $y_2$ (n) into this system are digital signals sampled in a period of T seconds and having a certain value in every period T. These digital signals $y_1$ (n) and $y_2$ (n) are entered into the formula 2 matrix generating means 403 and first delay means 404 as data strings free from delay. At the same timing, the outputs (formula 9) and (formula 10), calculated in the formula 18 matrix calculating means 406, are also delivered as data free from delay.

Figure 7:
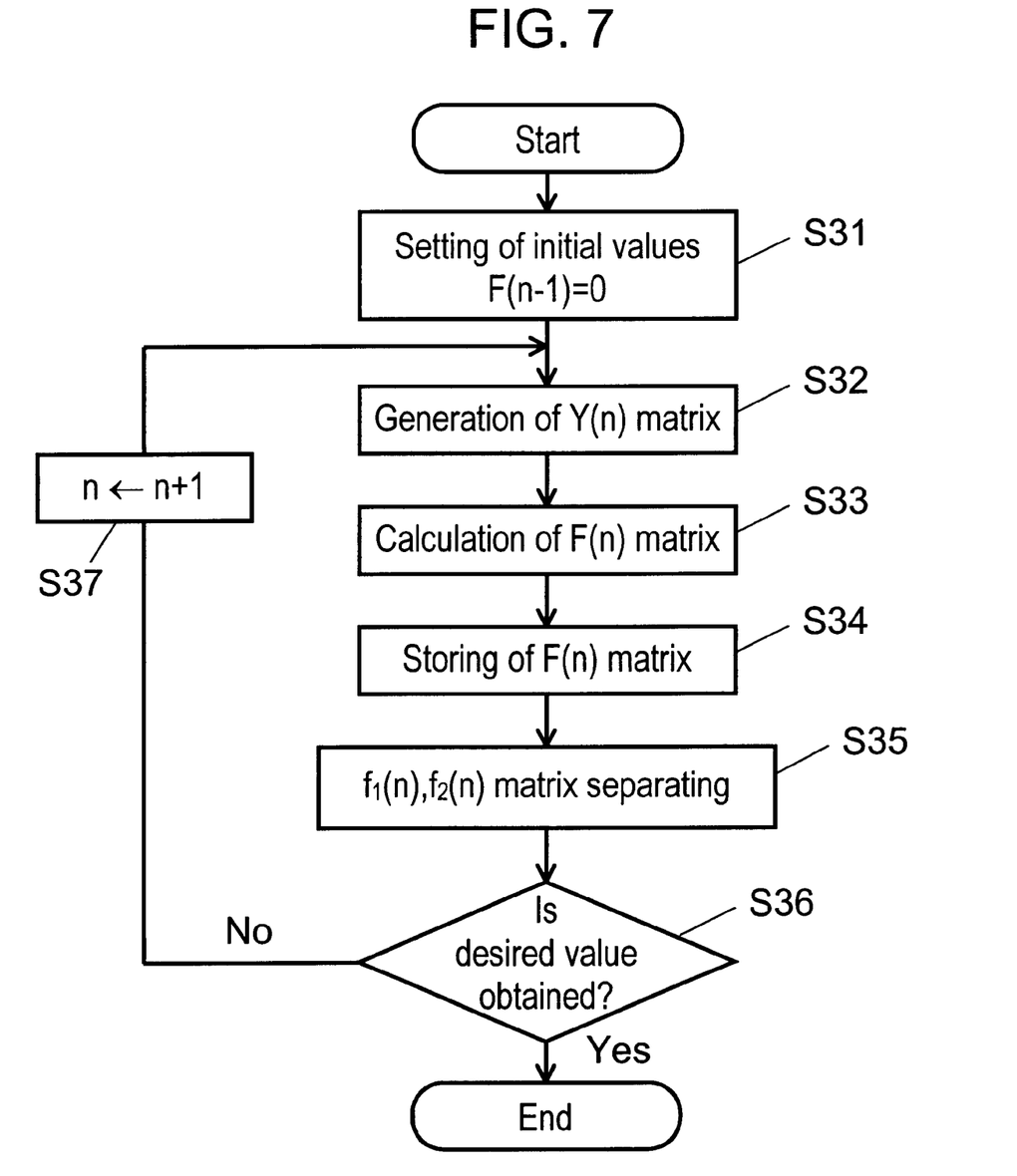
FIG. 7 is a flowchart showing the operation of the system identification device in FIG. 6.

The operation of the system identification device in FIG. 6 is described while referring to FIG. 7. FIG. 7 is a flowchart showing the operation of the system identification device in FIG. 6. This operation is explained as being started from time n.

First, initial values are set as shown in formula 44 (S31). Then, the formula 2 matrix generating means 403 generates an input matrix (formula 2) shown in formula 1 from the one time unit delay (first delay step) of the input digital signal $y_2$ (n) by the first delay means 404 and input digital signal $y_1$ (n) (S32, formula 2 matrix generating step). The formula 18 matrix calculating means 406 calculates the state matrix (formula 18) shown in formula 17 (S33, formula 18 matrix calculating step). The second delay means 405 stores the state matrix (formula 18) calculated at step 33 (S34, second delay step). Then, the formula 9 and formula 10 matrix separating means 407 separates into the impulse response (formula 9) identifying the first unknown system 102 and the impulse response (formula 10) identifying the second unknown system 103 (S35, formula 9 and formula 10 matrix separating step). An evaluation step (not shown in FIG. 6) for arbitrarily processing the impulse responses (formula 9), (formula 10) of the unknown systems separated at step 35 is provided at the later stage of each output line, and the evaluation amount is obtained. (For example, in echo canceling step, the echo erasing amount or the like is calculated.) It is then judged whether the desired value is obtained or not (S36). Unless reaching the desired value, moving to step S37, at next time value, the process jumps to step S32 in order to process similarly. Thereafter, steps 32 to 36 are repeated until the desired value is obtained. When the desired value is obtained, the process is terminated.

The above operation of the system identification device is performed during time T from input of a certain digital signal till input of a next digital signal. This is one cycle of the system identification device, and the system is identified by repeating the same operation on the digital signals entered successively. Incidentally, formula 8 is the identified values of formula 46 and formula 47, and hence the values do not change, usually, with the passing of the time. In the case of sequential updating process, however, since formula 8 is gradually set closer to formula 46 and formula 47, formula 18 is transformed to formula 23. By recording the program for executing the system identification method of the embodiment shown in FIG. 7 in a recording medium, this operation can be easily executed by a computer system, and since it is easy to move the recording medium, each step can be executed anywhere. The recording medium is, for example, an optical disk, but not limited to this, similar effects are obtained in IC card, ROM cassette and others capable of recording the program.

Thus, according to the embodiment, when identifying the system, the digital signals x (n) required in the unknown systems 102 and 103 are not necessary in the system identification device. Or, when the system identification device is composed as in reference 1 or reference 2, only off-line system identification was possible, but in the method of this embodiment, sequential system identification is possible, and if the characteristic of the unknown system is changed due to some reason, possibility of different identification is eliminated, and it does not require calculation of inverse matrix that takes an enormous amount operation.

Incidentally, the identification method of embodiment 2 is greater in the quantity of operation than in embodiment 4, but it is faster in the speed of convergence until reaching the target value. On the other hand, the identification method of embodiment 4 is smaller in the quantity of operation than in embodiment 2, but it is slower in the speed of convergence. According to the invention, any identification method may be selected depending on the system environments, and the scope of application of the invention is hence very wide.

What is claimed is:

1. A system identification method, being a system identification method for identifying an unknown system by feeding output digital signal y1 (n) and output digital signal y2 (n) of the unknown system, comprising:

a delay step for delaying the input digital signal $y_2$ (n) by one unit time;

a formula 2 matrix generating step for generating an input matrix (formula 2) shown in formula 1 from the input digital signal $y_1$ (n) and the digital signal $Y_2$ (n−1) output at said delay step;

a formula 4 matrix calculating step for calculating the state matrix (formula 4) shown in formula 3 from the matrix output at said formula 2 matrix generating step;

a formula 6 matrix calculating step for calculating the state matrix (formula 6) shown in formula 5 from the matrix output at said formula 2 matrix generating step and said digital signal $y_2$ (n);

a judging step of judging the component of said state matrix (formula 4), connecting the switch when converged, and outputting the state matrix (formula 4) and state matrix (formula 6) at this time from said formula 4 matrix calculating step and said formula 6 matrix calculating step;

a formula 8 matrix calculating step for calculating the state matrix (formula 8) shown in formula 7 by using the matrices output at said formula 4 matrix calculating step and said formula 6 matrix calculating step; and a formula 9 and formula 10 matrix separating step for separating formula 9 and formula 10 identified at said formula 8 matrix calculating step into a necessary format individually;

wherein formulas 1–10 are as follows:

$$Y(n) = yI(n)\begin{pmatrix} -y_2(n-1) \\ -y_2(n-2) \\ \vdots \\ -y_2(n-L_1+2) \\ -y_2(n-L_1+1) \\ y_1(n) \\ y(n-1) \\ \vdots \\ y_1(n-L_2+2) \\ y_1(n-L_2+1) \end{pmatrix} \quad [\text{Formula 1}]$$

$Y(n)$ [formula 2]

$E[Y(n)Y^t(n)]=R$ [formula 3]

$R$ [formula 4]

$E[y_1(n)y_2(n)Y(n)]=P$ [formula 5]

$P$ [formula 6]

$F=R^{-1}P$ [formula 7]

$F$ [formula 8]

$f_1$ [formula 9]

$f_2$. [formula 10]

2. A system identification method, being a system identification method for identifying an unknown system by feeding output digital signal $y_1$ (n) and output digital signal $y_2$ (n) of the unknown system, comprising:

a first delay step for delaying the input digital signal $y_2$ (n) by one unit time;

a formula 2 matrix generating step for generating an input matrix (formula 2) shown in formula 1 from the input digital signal $y_1$ (n) and the digital signal $y_2$ (n−1) output at said first delay step;

a formula 13 matrix calculating step for calculating the state matrix (formula 13) at the present time shown in formula 12 from the matrix output at said formula 2 matrix generating step and the state matrix (formula 11) calculated one unit time before;

a formula 15 matrix calculating step for calculating the state matrix (formula 15) at the present time shown in formula 14 from the matrix output at said formula 2 matrix generating step, the matrix output at said formula 13 matrix calculating step, and the state matrix (formula 11) calculated one unit time before;

a second delay step for storing the matrix output at said formula 15 matrix calculating step;

a formula 18 matrix calculating step for calculating the state matrix (formula 18) at the present time shown in formula 17 from the matrix output at said formula 2 matrix generating step, said input digital signal $y_2$ (n), said input digital signal $y_1$ (n), the matrix output at said formula 13 matrix calculating step, and the state matrix (formula 16) calculated one unit time before;

a third delay step for storing the matrix output at said formula 18 matrix calculating step; and a formula 19 and formula 20 matrix separating step for separating formula 19 and formula 20 identified at said formula 18 matrix calculating step into a necessary format individually;

wherein formulas 11–20 are as follows:

$Q(n-1)$ [formula 11]

$K(n) = \dfrac{Q(n-1)Y(n)}{\{1+Y^t(n)Q(n-1)Y(n)\}}$ [formula 12]

$K(n)$ [formula 13]

$Q(n)=Q(n-1)-K(n)Y^t(n)Q(n-1)$ [formula 14]

$Q(n)$ [formula 15]

$F(n-1)$ [formula 16]

$F(n)=F(n-1)+K(n)\{y_1(n)y_2(n)--Y^t(n)F(n-1)\}$ [formula 17]

$F(n)$ [formula 18]

$f_1(n)$ [formula 19]

$f_2(n)$. [formula 20]

3. A system identification method, being a system identification method for identifying an unknown system by feeding output digital signal $y_1$ (n) and output digital signal $y_2$ (n) of the unknown system, comprising:

a first delay step for delaying the input digital signal $y_2$ (n) by one unit time;

a formula 2 matrix generating step for generating an input matrix (formula 2) shown in formula 1 from the input digital signal $y_1$ (n) and the digital signal $y_2$ (n−1) output at said first delay step;

a formula 13 matrix calculating step for calculating the state matrix (formula 13) at the present time shown in formula 21 from the matrix output at said formula 2 matrix generating step and the state matrix (formula 11) calculated one unit time before;

a formula 15 matrix calculating step for calculating the state matrix (formula 15) at the present time shown in formula 22 from the matrix output at said formula 2 matrix generating step, the matrix output at said formula 13 matrix calculating step, and the state matrix (formula 11) calculated one unit time before;

a second delay step for storing the matrix output at said formula 15 matrix calculating step;

a formula 18 matrix calculating step for calculating the state matrix (formula 18) at the present time shown in formula 17 from the matrix output at said formula 2 matrix generating step, said input digital signal $y_2$ (n), said input digital signal $y_1$ (n), the matrix output at said formula 13 matrix calculating step, and the state matrix (formula 16) calculated one unit time before;

a third delay step for storing the matrix output at said formula 18 matrix calculating step; and a formula 19 and formula 20 matrix separating step for separating formula 19 and formula 20 identified at said formula 18 matrix calculating step into a necessary format individually;

wherein formulas 21–22 are as follows:

$$K(n) = \frac{\hat{a}.^{-1}Q(n-1)Y(n)}{\{1+\hat{a}.^{-1}Y(n)Q(n-1)Y(n)\}} \qquad \text{[formula 21]}$$

$$K(n) = \frac{\lambda^{--1}Q(n-1)Y(n)}{\{1+\lambda^{-1}Y(n)Q(n-1)Y(n)\}}$$

$$Q(n)=\lambda^{-1}Q(n-1)-\lambda^{-1}K(n)Y^t(n)Q(n-1). \qquad \text{[formula 22]}$$

4. A system identification method, being a system identification method for identifying an unknown system by feeding output digital signal $y_1$ (n) and output digital signal $y_2$ (n) of the unknown system, comprising;
- a first delay step for delaying the input digital signal $y_2$ (n) by one unit time;
- a formula 2 matrix generating step for generating an input matrix (formula 2) shown in formula 1 from the input digital signal $y_1$ (n) and the digital signal $y_2$ (n−1) output at said first delay step;
- a formula 18 matrix calculating step for calculating the state matrix (formula 18) at the present time shown in formula 23 from the matrix output at said formula 2 matrix generating step, the state matrix (formula 16) calculated one unit time before, digital signal $y_2$ (n), and digital signal $y_1$ (n);
- a second delay step for delaying the state matrix (formula 18) at the present time output at said formula 18 matrix calculating step; and
- a formula 19 and formula 20 matrix separating step for separating formula 19 and formula 20 identified at said formula 18 matrix calculating step into a necessary format individually;

wherein formula 23 is as follows:

$$F(n)=F(n-1)-\mu(y_1(n)y_2(n)-F^t(n-1)Y(n))Y(n). \qquad \text{[formula 23]}$$

5. A recording medium recording a program, being a recording medium recording a program for executing a system identification method for identifying an unknown system by feeding output digital signal $y_1$ (n) and output digital signal $y_2$ (n) of the unknown system, comprising:
- a delay step for delaying the input digital signal $y_2$ (n) by one unit time;
- a formula 2 matrix generating step for generating an input matrix (formula 2) shown in formula 1 from the input digital signal $y_1$ (n) and the digital signal $y_2$ (n−1) output at said delay step;
- a formula 4 matrix calculating step for calculating the state matrix (formula 4) shown in formula 3 from the matrix output at said formula 2 matrix generating step;
- a formula 6 matrix calculating step for calculating the state matrix (formula 6) shown in formula 5 from the matrix output at said formula 2 matrix generating step and said digital signal $y_2$ (n);
- a judging step of judging the component of said state matrix (formula 4), connecting the switch when converged, and outputting the state matrix (formula 4) and state matrix (formula 6) at this time from said formula 4 matrix calculating step and said formula 6 matrix calculating step;
- a formula 8 matrix calculating step for calculating the state matrix (formula 8) shown in formula 7 by using the matrices output at said formula 4 matrix calculating step and said formula 6 matrix calculating step; and
- a formula 9 and formula 10 matrix separating step for separating formula 9 and formula 10 identified at said formula 8 matrix calculating step into a necessary format individually.

6. A recording medium recording a program, being a recording medium recording a program for executing a system identification method for identifying an unknown system by feeding output digital signal $y_1$ (n) and output digital signal $Y_2$ (n) of the unknown system, comprising;
- a first delay step for delaying the input digital signal $y_2$ (n) by one unit time;
- a formula 2 matrix generating step for generating an input matrix (formula 2) shown in formula 1 from the input digital signal $y_1$ (n) and the digital signal $y_2$ (n−1) output at said first delay step;
- a formula 13 matrix calculating step for calculating the state matrix (formula 13) at the present time shown in formula 12 from the matrix output at said formula 2 matrix generating step and the state matrix (formula 11) calculated one unit time before;
- a formula 15 matrix calculating step for calculating the state matrix (formula 15) at the present time shown in formula 14 from the matrix output at said formula 2 matrix generating step, the matrix output at said formula 13 matrix calculating step, and the state matrix (formula 11) calculated one unit time before;
- a second delay step for storing the matrix output at said formula 15 matrix calculating step;
- a formula 18 matrix calculating step for calculating the state matrix (formula 18) at the present time shown in formula 17 from the matrix output at said formula 2 matrix generating step, said input digital signal $y_2$ (n), said input digital signal $y_1$ (n), the matrix output at said formula 13 matrix calculating step, and the state matrix (formula 16) calculated one unit time before;
- a third delay step for storing the matrix output at said formula 18 matrix calculating step; and
- a formula 19 and formula 20 matrix separating step for separating formula 19 and formula 20 identified at said formula 18 matrix calculating step into a necessary format individually.

7. A recording medium recording a program, being a recording medium recording a program for executing a system identification method for identifying an unknown system by feeding output digital signal $y_1$ (n) and output digital signal $y_2$ (n) of the unknown system, comprising:
- a first delay step for delaying the input digital signal $y_2$ (n) by one unit time;
- a formula 2 matrix generating step for generating an input matrix (formula 2) shown in formula 1 from the input digital signal $y_1$ (n) and the digital signal $y_2$ (n−1) output at said first delay step;
- a formula 13 matrix calculating step for calculating the state matrix (formula 13) at the present time shown in formula 21 from the matrix output at said formula 2 matrix generating step and the state matrix (formula 11) calculated one unit time before;
- a formula 15 matrix calculating step for calculating the state matrix (formula 15) at the present time shown in formula 22 from the matrix output at said formula 2 matrix generating step, the matrix output at said formula 13 matrix calculating step, and the state matrix (formula 11) calculated one unit time before;
- a second delay step for storing the matrix output at said formula 15 matrix calculating step;

a formula 18 matrix calculating step for calculating the state matrix (formula 18) at the present time shown in formula 17 from the matrix output at said formula 2 matrix generating step, the state matrix (formula 16) calculated one unit time before, the matrix output at said formula 13 matrix calculating step, said input digital signal $y_1$ (n), and said input digital signal $y_2$ (n);

a third delay step for storing the matrix output at said formula 18 matrix calculating step; and a formula 19 and formula 20 matrix separating step for separating formula 19 and formula 20 identified at said formula 18 matrix calculating step into a necessary format individually.

8. A recording medium recording a program, being a recording medium recording a program for executing a system identification method for identifying an unknown system by feeding output digital signal $y_1$ (n) and output digital signal $y_2$ (n) of the unknown system, comprising:

a first delay step for delaying the input digital signal $y_2$ (n) by one unit time;

a formula 2 matrix generating step for generating an input matrix (formula 2) shown in formula 1 from the input digital signal $y_1$ (n) and the digital signal $y_2$ (n−1) output at said first delay step;

a formula 18 matrix calculating step for calculating the state matrix (formula 18) at the present time shown in formula 23 from the matrix output at said formula 2 matrix generating step, the state matrix (formula 16) calculated one unit time before, digital signal $y_2$ (n), and digital signal $y_1$ (n);

a second delay step for delaying the state matrix (formula 18) at the present time output at said formula 18 matrix calculating step; and a formula 19 and formula 20 matrix separating step for separating formula 19 and formula 20 identified at said formula 18 matrix calculating step into a necessary format individually.

\* \* \* \* \*